Jan. 15, 1963  W. BRANDL  3,073,940
SAFETY DEVICE FOR HEATING APPLIANCES
Filed Feb. 3, 1961
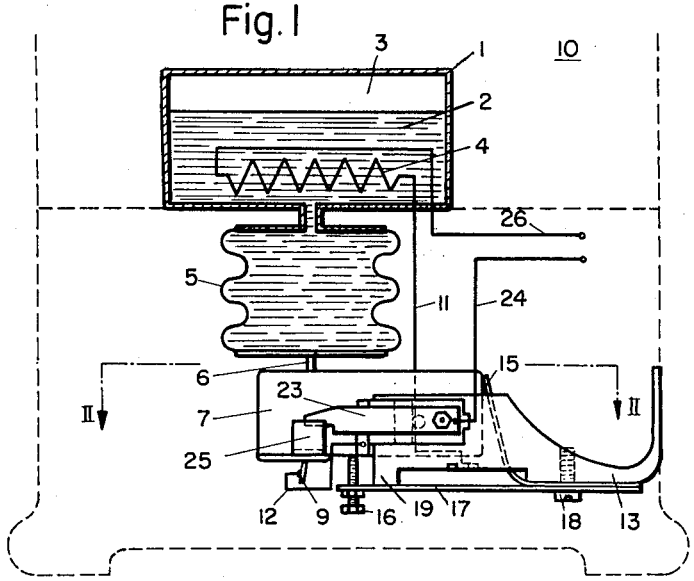
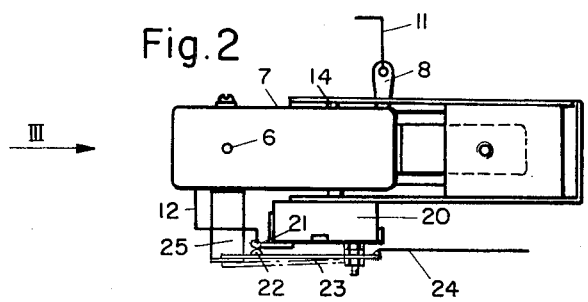
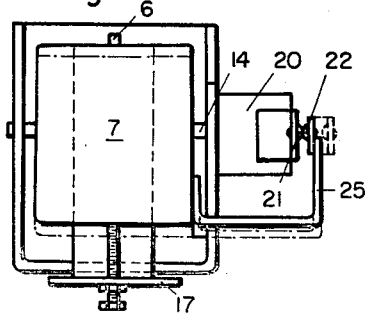

United States Patent Office 3,073,940
Patented Jan. 15, 1963

3,073,940
SAFETY DEVICE FOR HEATING APPLIANCES
Wilhelm Brandl, 12 Schurbungert, Zurich, Switzerland
Filed Feb. 3, 1961, Ser. No. 86,951
Claims priority, application Switzerland Feb. 5, 1960
5 Claims. (Cl. 219—20)

The present invention relates to a safety device on a heating appliance for liquids, for example for a coffee percolator, and has the primary object of providing an additional safeguard against overheating in case of failure of the conventional safety device.

It is another object of the present invention to provide a safety device of the kind referred to which occupies as little space as possible, is inexpensive in production and reliable in operation.

With these and other objects in view, which will become apparent later from this specification and the accompanying drawing, I provide a safety device.

It is another object of the present invention to provide a safety device of the kind referred to which occupies as little space as possible, is inexpensive in production and reliable in operation.

With these and other objects in view, which will become apparent later from this specification and the accompanying drawing, I provide a safety device for heating appliances comprising in combination: a vessel in operation evacuated and partly filled with an evaporatable liquid, an electric heating element arranged in the said vessel submerged in the said liquid, an expansible member responsive to the pressure prevailing inside the said vessel, a primary switch electrically connected to the said expansible member, in the sense of being switched off by the expansion thereof, a fixed abutment, and element resiliently deformable in the direction of expansion of the said member and abutting the said fixed abutment and a secondary switch electrically connected to the said heating element and operatively connected to the said resiliently deformable element, and upon deformation of the latter switching off the current supply to the said heating element.

These and other features of my said invention will be clearly understood from the following description of a preferred embodiment thereof, given by way of example with reference to the accompanying drawing, in which:

FIG. 1 is a side elevation of an electric heater appliance having a pressure-responsive member acting on a switch, with a safety device, FIG. 2 is a plan view of the switch in section on the line II—II of FIG. 1; and FIG. 3 is an elevation of the switch in the direction of the arrow III of FIG. 2, on a larger scale.

In FIG. 1 the vessel of the heating appliance is denoted 1. The same is partly filled with water 2 and includes an evacuated space 3 above the water level. Moreover an electric heater element 4, illustrated diagrammatically only, is arranged within the water. The vessel 1 is in communication with a pressure-sensitive bellows 5 which expands, when the internal pressure in the vessel 1 increases, and acts on the actuating button 6 of a micro-switch 7 which switches the current supply to the heater element 4 on and off.

The heating appliance is built into the pedestal of a coffee percolator indicated in FIG. 1 only in dotted lines, the vessel 1 extending into the water chamber 10 of this percolator.

The swtich 7 is of a commercial type and its construction is not therefore explained in detail. It has two lugs 8 and 9 for the connection of the current supply conductors 11 and 12, respectively. When no pressure or only a weak one is applied to the button 6, the switch is opened, and it closes at once again, when the pressure subsides.

The switch 7 is mounted on a bracket 13 pivotally about an axle 14 (FIGS. 2 and 3). The bracket 13 is rigidly connected to the casing of the coffee percolator. On the bracket 13 moreover a leaf spring 15 is screwed by means of a spring 18, which spring tends to tip the switch 7 about the axle 14 in the counterclockwise direction (see FIG. 1). This tipping is prevented by an abutment screw 16. The latter is screwed fast into a screw-tapped bore of a second leaf spring 17, which is likewise attached to the bracket by means of the screw 18. The leaf spring 17 is pre-loaded in such a manner that it tends to force the switch 7 upward through the screw 16. This is, however, not possible, since an abutment 19 forming part of the bracket 13 holds the leaf spring 17 in the position shown in FIG. 1. The leaf spring 17 can accordingly deflect downward only, when the bellows 5 applies a pressure through the switch 7 to the screw 16, which exceeds the pre-loading of the leaf spring 17. This preloading is selected higher than the switching force of the switch 7.

On the bracket 13 a secondary switch is attached which is actuated by a deflection of the leaf spring 17 and then interrupts the current supply to the heating element 4. On an insulator body 20 a fixed constact piece 21 is arranged to which the conductor 12 is connected. A second contact piece 22 is arranged on a resilient tongue 23, which is pre-stressed to such an extent that the contact piece 21 does not touch the contact piece 22 in the rest position, as indicated in chain-dotted lines in FIGS. 2 and 3. The tongue 23 is connected to the conductor 24. On the switch 7 a yoke 25 is attached which embraces the tongue 23 at the forward end and forces the same against the fixed contact piece 21, so that the contact pieces 21 and 22 touch one another as long as the yoke 25 embraces the tongue 23. This is the case, when the switch 7 is forced by the leaf spring 17 into its normal working position as illustrated in FIG. 1.

The manner of functioning of the safety device is as follows:

When the conductors 24 and 26 are connected to a current source, the circuit from the conductor 26 is closed through the heating element 4, conductor 11, lug 8, switch 7, lug 9, conductor 12, contact piece 21, contact piece 22, tongue 23 and conductor 24. Accordingly the heating element 4 heats the water 2.

Since the chamber 3 is evacuated, the water therein evaporates at once and heats the walls of the vessel 1, which in turn heat the water filled into the chamber 10. By the evaporation of the water 2 excess pressure is generated in the interior of the vessel 1. Thereby the bellows 5 is expanded so that it bears on the actuating button 6 of the switch 7. Upon the pressure in the vessel 1 attaining a predetermined magnitude corresponding to a certain temperature, the bellows 5 overcomes the switching-off force of the switch 7. The current supply to the heating element 4 is thus interrupted, and a further increase of the pressure and accordingly of the temperature in the vessel 1 is obviated. As soon as the pressure in the vessel 1 has dropped slightly the bellows 5 contracts again slightly, and the switch 7 closes again. In this manner it is possible to achieve the maintaining of a pre-determined temperature in the vessel 1. By adjusting the screw 16 involving a tipping of the switch 7 about the axle 14 the temperature desired in the vessel 1 may be regulated.

When now owing to a failure of the switch 7 the same does not interrupt the circuit, the pressure in the vessel 1 keeps rising and the bellows 5 expands further. It then bears on the switch 7 until the leaf spring 17 begins deflecting downward. With the switch 7 also the yoke 25 moves downward until it finally releases the tongue 23. The latter swings outward owing to its being pre-stressed, so that the contact pieces 21, 22 are separated from one another, and the circuit of the heating element is interrupted. The latter is thereby protected from detrimental overheating.

The heating appliance with the safety device described herein in connection with a coffee percolator may be used also for other purposes. Moreover the contact pieces 22, 23 may be arranged in another position and may be operated directly by the leaf spring 17. Finally it would be possible to use another resilient member instead of a leaf spring.

While I have described herein and illustrated in the accompanying drawing what may be considered a typical and particularly useful embodiment of my said invention, I wish it to be understood that I do not limit myself to the particular details and dimensions described and illustrated; for obvious modifications will occur to a person skilled in the art.

What I claim as my invention and desire to secure by Letters Patent, is:

1. A safety device for a heating appliance comprising in combination: a vessel in operation evacuated and partly filled with an evaporatable liquid, an electric heating element arranged in the said vessel submerged in the said liquid, an expansible member responsive to the pressure prevailing inside the said vessel, a primary switch electrically connected to the said heating element and operatively connected to the said expansible member in the sense of being switched off by the expansion thereof, a fixed abutment, an element resiliently deformable in the direction of expansion of the said member and abutting the said fixed abutment, and a secondary switch electrically connected to the said heating element and operatively connected to the said resiliently deformable element and upon deformation of the latter switching off the current supply to the said heating element.

2. A safety device as claimed in claim 1, comprising a fixed bracket, a pivot pin mounted in the said bracket and carrying the said primary switch, and a leaf spring fixed at one end to said bracket and constituting the said resiliently deformable element.

3. A safety device as claimed in claim 1, wherein the said resiliently deformable element is pre-stressed in a direction opposite the direction of expansion of the said expansible member, the magnitude of the said pre-stressing exceeding the switching force of the said primary switch.

4. A safety device as claimed in claim 1, wherein the said resiliently deformable element directly operates the said secondary switch.

5. A safety device for a heating appliance, comprising in combination a vessel in operation evacuated and partly filled with an evaporable liquid, an electric heating element arranged in the said vessel within the said liquid, an expansible member responsive to the pressure prevailing inside the said vessel, a fixed bracket, a primary switch elecrtically connected to the said heating element and pivotally mounted on the said bracket in operative range of the said expansible member in the sense of being switched off by the expansion thereof, a leaf spring fitted to the said bracket at one end and resiliently abutting the said primary switch at the other end biasing the same opposite the direction of expansion of said expansible member, a yoke fixedly attached to the said primary switch, and a secondary switch electrically connected to the said heating element and attached to the said bracket, said secondary switch having a fixed contact piece and a resilient tongue having a second contact piece, the said resilient tongue being kept in conductive contact with the said fixed contact piece by the said yoke in the normal position of the said pivotally mounted primary switch, and cleared by said yoke so as to resiliently leave the said fixed contact piece in a tipped position of said pivotally mounted primary switch.

References Cited in the file of this patent

UNITED STATES PATENTS

| 2,289,882 | Myers | July 14, 1942 |
| 2,788,416 | Kilbury | Apr. 9, 1957 |
| 2,901,578 | Noakes | Aug. 25, 1959 |
| 2,927,186 | Brandl | Mar. 1, 1960 |

FOREIGN PATENTS

| 94,390 | Norway | Aug. 3, 1959 |